April 21, 1936.　　　　E. G. SIMPSON　　　　2,038,062

INSIDE DOOR HANDLE ASSEMBLY FOR AN AUTOMOTIVE VEHICLE

Filed Nov. 15, 1934　　　2 Sheets-Sheet 1

INVENTOR.
EMORY GLENN SIMPSON
BY
Barnes, Kisselle, Laughlin and Raisch
ATTORNEYS.

April 21, 1936.　　　E. G. SIMPSON　　　2,038,062
INSIDE DOOR HANDLE ASSEMBLY FOR AN AUTOMOTIVE VEHICLE
Filed Nov. 15, 1934　　　2 Sheets-Sheet 2

INVENTOR.
EMORY GLENN SIMPSON
BY
Barnes, Kisselle, Laughlin and Raisch
ATTORNEYS.

Patented Apr. 21, 1936

2,038,062

UNITED STATES PATENT OFFICE 2,038,062

INSIDE DOOR HANDLE ASSEMBLY FOR AN AUTOMOTIVE VEHICLE

Emory Glenn Simpson, Detroit, Mich., assignor to Ternstedt Manufacturing Company, Detroit, Mich., a corporation of Michigan Application November 15, 1934, Serial No. 753,191

6 Claims. (Cl. 296—44)

This invention relates to an inside door handle assembly for an automotive vehicle.

With the passing of the out-moded front door window assembly in which the front door window opening was controlled by a single upwardly and downwardly slidable window glass which required but a single regulator, and with the advent of the Fisher no draft ventilation system in which the front portion of the front door window opening is controlled by a glass pivoted to swing on a vertical axis intermediate its front and rear edges and the rear portion of the window opening is controlled by an upwardly and downwardly slidable window glass, a new problem arose in properly locating the door hardware. Where a single window regulator and regulator crank handle were previously required, two window regulators and handles are now required, one for the swinging panel and the other for the sliding panel. This problem of locating these handles as well as the inside remote latch handle so that they do not interfere with each other and with the comfort of the passenger or driver has been further complicated by the addition to the inner face of the door of an arm rest. A further problem is that of positioning the inside remote door latch handle where it may be conveniently reached and operated by the passenger without obstructing the operation of the regulator handles.

It is an object of this invention to solve the above-mentioned problems and produce an inside remote door latch handle assembly which is located so that it will not interfere with the regulator handles, which is conveniently accessible to the passenger, and which by means of the arm rest is very easily and advantageously operated.

Figure 1:
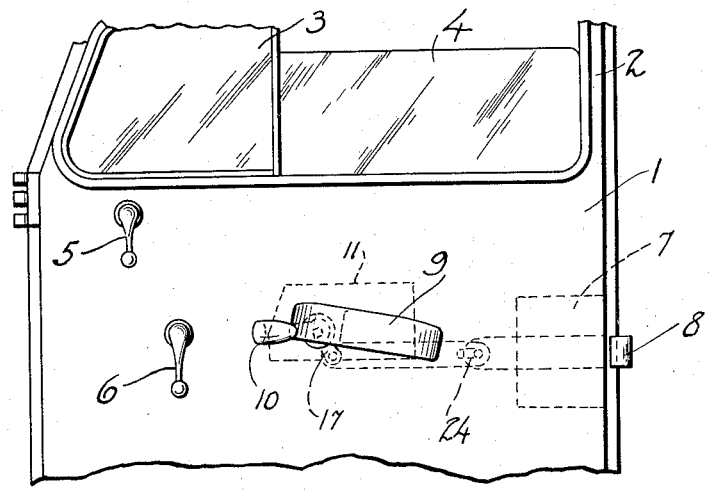
Fig. 1 is a fragmentary inside elevation of a vehicle door showing the location of the inside remote latch handle and arm rest.

Referring more particularly to the drawings there is shown a vehicle door 1 having a window opening 2. The front portion of the window opening 2 is closed by a swinging panel 3 and the rear portion by a sliding panel 4. The panels 3 and 4 are operated by suitable regulators (not shown) operated respectively by the handles 5 and 6. The door 1 is provided with any suitable latch generally designated 7 having a retractable latch bolt 8.

An arm rest 9 is mounted on the inner face of the door. The arm rest 9 is positioned on the inner face of the door above the seat where it is conveniently accessible to the passenger. The arm rest 9 and the inside remote handle 10 may conveniently be located upon a single mounting plate 11 which is secured by screws 12 to the lock board 13.

Figure 3:
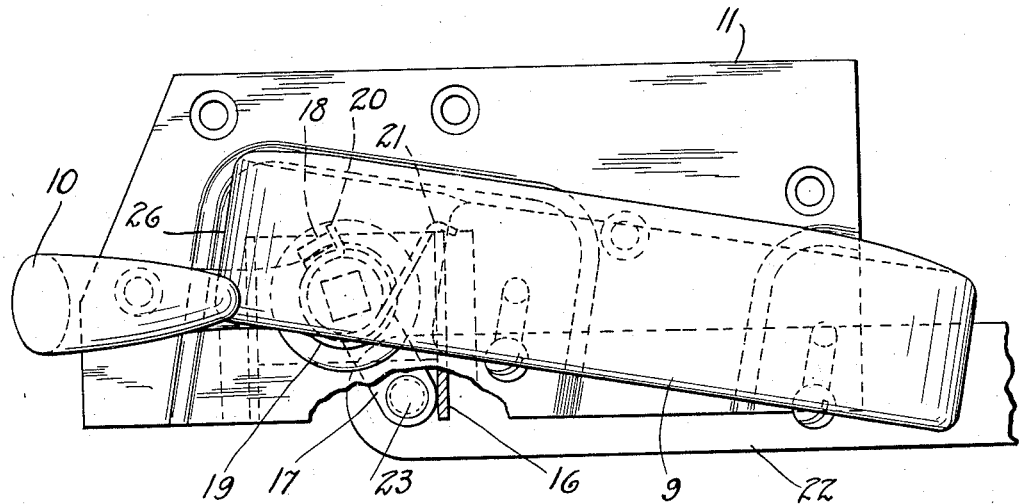
Fig. 3 is a side elevation of the remote latch handle and arm rest.

The inside remote door latch handle 10 may be rotatably mounted upon the inner face of the door in any suitable manner. As shown, the handle 10 is mounted upon a spindle 14. The spindle 14 is rotatably mounted in a suitable bearing and opening 15 in the support plate 11 and a suitable bearing opening in the cover plate 16 mounted on the back of the support plate 11. The spindle 14 has fixed thereto the lever 17, the upper end of which is provided with the inturned lug 18. A suitable coil spring 19 is mounted over the spindle 14. One end 20 of the coil spring 19 engages the lug 18 and the other end 21 engages the cover plate. The spring 19 normally yieldably holds the lower end of the lever 17 in abutting relation with the cover plate 16 and the handle 10 in substantially horizontal position as shown in Fig. 3. The link 22 is connected as at 23 with the lower end of the lever 17 and at the other end has a lost motion connection with the bolt 8 as at 24.

It will be noted that the arm rest 9 is recessed as at 25 along its outer face adjacent the face of the door which permits the handle 10 to be pivoted on the inner face of the door to the rear of the front end 26 of the arm rest 9. By thus mounting the lever handle 10, the handle may be made long enough to obtain the proper lever advantage for turning the spindle 14 to retract the bolt 8 and yet a considerable portion of the handle occupies space on the inside of the door which would otherwise be occupied by the arm rest 9. This also reduces the amount the handle projects forward of the arm rest. The recessing of the arm rest 9 as at 25 does not in any wise interfere with the normal functioning of the arm rest. This pivotal mounting of the handle 10 on the door in the opening provided by the recess 29 of the arm rest also gives a greater amount of space available on the inner face of the door for the mounting of the regulator handles.

The handle 10 may be looped outwardly from the inner face of the door to a point in line with the inside face 27 of the arm rest and then rearwardly toward the front end 26 of the arm rest. The outer end of the handle 10 is positioned close to the front end 26 of the arm rest and is offset towards the door from the inner face 27 of the arm rest. This curving of the inner end of the handle towards the arm rest permits the arm rest to act in the nature of a shield and thus prevent one's clothes from being caught on the end of the handle. This looping of the handle 10 makes the handle more easily grasped by the passenger when using the handle 10 as a pull-to when closing the door.

Figure 2:
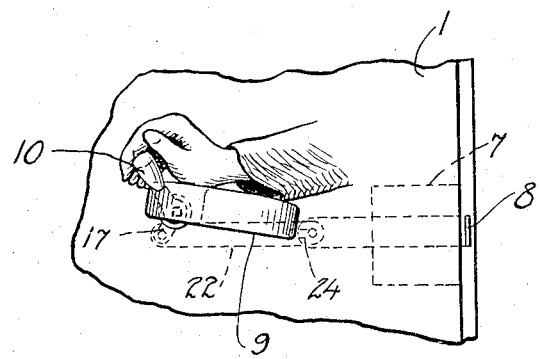
Fig. 2 is a detail view showing the inside remote latch handle being operated by a passenger.
Figure 5:
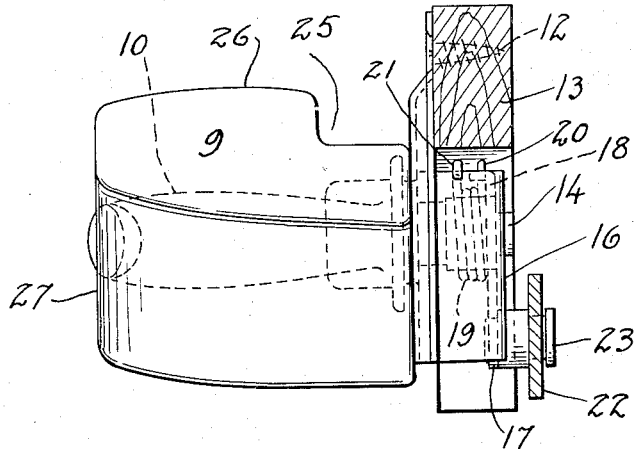
Fig. 5 is an end view looking forwardly of the arm rest and remote handle.
Figure 4:
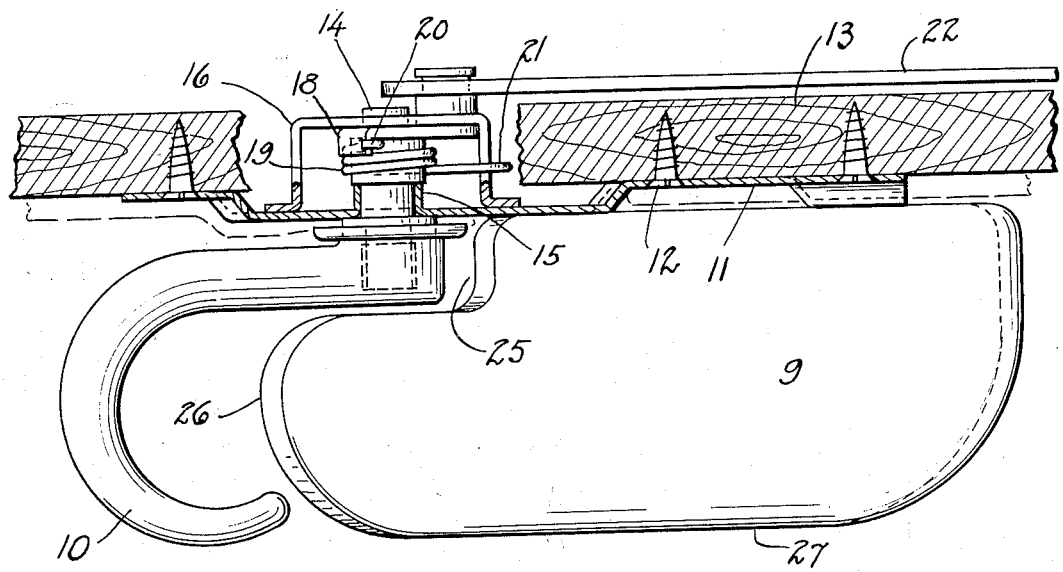
Fig. 4 is a top plan view partly in section of the inside remote handle and arm rest.

When it is desired to open the door the bolt 8 must first be retracted. This requires the overcoming of the resistance of the bolt spring as well as the spring 19. It will be noted that the overcoming of this resistance, while retracting the latch bolt, is made very much easier by locating the handle 10 relative to the arm rest 9 so that the arm rest 9 can be used as a fulcrum by the operator upon which he rests his hand and/or arm, as shown in Fig. 2, while swinging the handle 10 upwardly to retract the bolt. The term "arm" is used broadly herein to include the wrist and the hand as well as the body appendage extending between the wrist and the shoulder which is technically called the arm.

I claim:

1. In an automotive vehicle body, an arm rest, a manually operable lever handle movably mounted on the body between the front and rear ends of the arm rest and having a hand grip portion spaced from the arm rest whereby during the manual operation of the handle the arm may be rested upon the arm rest as a fulcrum to facilitate operation of the handle.

2. In an automotive vehicle body, an arm rest, a manually operable lever handle swingably mounted on the body between the front and rear ends of the arm rest and having a hand grip portion positioned forwardly of the front end of the arm rest whereby during the manual operation of the handle the arm may be rested upon the arm rest as a fulcrum to facilitate operation of the handle.

3. In an automotive vehicle body having a door and a door latch with a spring projected bolt, an arm rest mounted on the inner face of the door, the said arm rest having a recess in the side adjacent the face of the door, a manually operable lever handle pivotally mounted on the inner face of the door between the front and rear ends of the arm rest and swingable in the said recess in the arm rest, operative connections between the latch bolt and the said lever handle, the said lever handle having a hand grip portion positioned forwardly of the arm rest whereby during manual operation of the lever handle the arm may be rested on the arm rest as a fulcrum to facilitate the swinging of the lever handle to retract the latch bolt.

4. In an automotive vehicle body having a hinged door, an arm rest, a manually operable latch handle pivotally mounted on the door having a hand grip portion spaced from the arm rest and the outer end positioned adjacent the arm rest whereby during the manual operation of the handle the arm may be rested on the arm rest as a fulcrum to facilitate operation of the handle and the arm rest may also serve as a shield for the outer end of the handle to prevent clothing being caught thereon.

5. In an automotive vehicle body having a door and a door latch with a spring projected bolt, an arm rest mounted on the inner face of the door, the said arm rest having a recess in the side adjacent the face of the door, a manually operable lever handle pivotally mounted on the inner face of the door between the front and rear ends of the arm rest and swingable in the said recess in the arm rest, operative connections between the latch bolt and the said lever handle, the said lever handle extending forwardly from the pivot in the said recess to a point beyond the front end of the arm rest, then outwardly and then rearwardly to a point adjacent the arm rest whereby the arm rest serves as a shield to prevent clothing from being caught on the outer open end of the handle.

6. In an automotive vehicle body, an arm rest mounted on the inner face of the body having a recess in the side adjacent the inner face of the body, a manually operable lever handle swingably mounted on the body arranged to swing in the said recess and having a hand grip portion spaced from the arm rest whereby during the manual operation of the handle the arm may be rested upon the arm rest as a fulcrum to facilitate operation of the handle.

EMORY GLENN SIMPSON.